Figure 1:
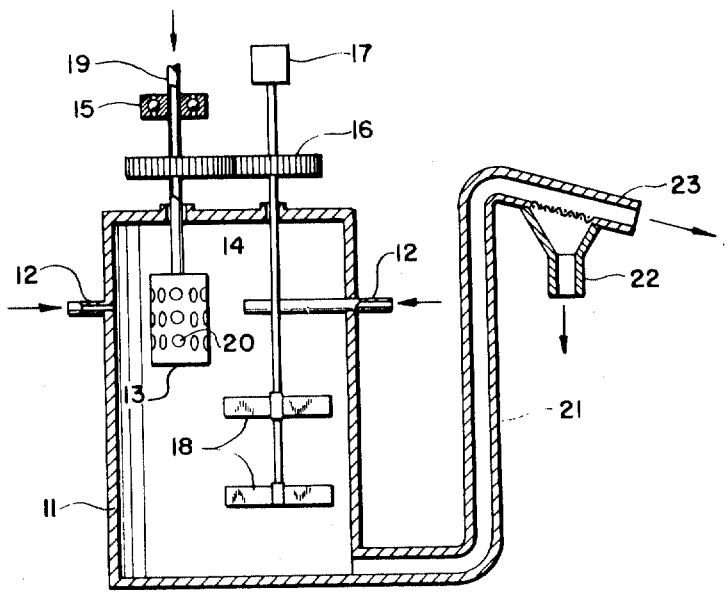

United States Patent

[11] 3,617,228

| | | |
|---|---|---|
| [72] | Inventor | Jacobus A. J. Smit<br>Amsterdam, Netherlands |
| [21] | Appl. No. | 746,196 |
| [22] | Filed | July 19, 1968 |
| [45] | Patented | Nov. 2, 1971 |
| [73] | Assignee | Shell Oil Company<br>New York, N.Y. |
| [32] | Priority | July 20, 1967 |
| [33] | | Great Britain |
| [31] | | 33,335/67 |

[54] PROCESS FOR MAKING AGGLOMERATES FROM SUSPENSIONS
2 Claims, 2 Drawing Figs.

[52] U.S. Cl. .......................................... 23/313,
264/117
[51] Int. Cl. ........................................... B01j 1/02
[50] Field of Search............................................. 23/313,
314; 264/117, 5, 8

[56] References Cited
UNITED STATES PATENTS

| 1,046,402 | 12/1912 | Sommermeyer | 23/269 |
| 1,940,585 | 5/1930 | Fauth | 23/269 |
| 2,299,929 | 10/1942 | Raynolds | 264/8 |
| 2,399,710 | 5/1946 | Schoch | 23/269 |

FOREIGN PATENTS

| 1,024,475 | 11/1962 | England | |

Primary Examiner—Norman Yudkoff
Assistant Examiner—S. Silverberg
Attorneys—Glen R. Grunewald and Harold L. Denkler ABSTRACT: An apparatus for preparing agglomerates from aqueous suspensions of carbon or coal, or the like, including a vessel with an inlet for suspension and an inlet for auxiliary liquid which is capable of agglomerating the solids in the suspension, and a particle and liquid outlet, the vessel containing a stirrer and a rotating cylindrical chamber having perforations in its curved surface and being adapted to receive suspension feed in the interior of the cylindrical chamber while auxiliary liquid is fed within the vessel, outside of the cylindrical chamber and near its rotating curved surface. Also disclosed is the process for forming agglomerates by introducing suspension and auxiliary liquid while the cylindrical chamber is rotating and the stirrer is agitating the liquid in the vessel.

PATENTED NOV 2 1971

3,617,228

INVENTOR:
JACOBUS A. J. SMIT
BY: Glen R. Grunewald
HIS ATTORNEY

A
PROCESS FOR MAKING AGGLOMERATES FROM SUSPENSIONS

THE INVENTION

This invention relates to a process for making relatively heavy agglomerates of solids from a suspension thereof in a liquid by imparting a turbulent motion to that suspension in the presence of an auxiliary liquid which promotes the agglomeration, the suspension and the auxiliary liquid both being supplied continuously. The invention also relates to an apparatus suitable for carrying out that process. The term relatively heavy agglomerates includes agglomerates having a higher density than the surrounding liquid.

It has been known for a long time that agglomerates can be made from particles suspended in a liquid by mixing the suspension with a dispersed second, or auxiliary liquid that preferentially wets the particles. An important application is the preparation of pellets of soot or of coal fines from a suspension thereof in water, using a heavy hydrocarbon as the auxiliary liquid. In this application the aqueous suspension and the liquid auxiliary substance are individually supplied continuously to a vessel in which the aqueous phase is continuous and in which stirring is applied, for instance with the aid of a propeller stirrer. It is thus possible to obtain a stream of pellets in water, which pellets can easily be separated from the water. A suitable apparatus for carrying out that process is described in the U. S. Pat. No. 1,024,475. The auxiliary liquid may be a heavy fuel oil, a bitumen or a coal tar product. It is also possible to use more than one auxiliary liquid. The auxiliary liquid wets the solid particles and thereby displaces the liquid, mostly the water, in which the solid is suspended. The auxiliary substance has the character of an adhesive, as a result of which the particles wetted by that substance agglomerate when touching each other.

When employing the process mentioned hereinbefore, it is found that an intermediate product in the form of sticky mass may form upon the introduction of the suspension and the auxiliary liquid, which sticky mass may readily deposit or attach to the walls of the equipment. Consequently, there is a risk of the inlets through which the suspension is introduced becoming clogged.

By the process and the apparatus according to the invention such deposits and clogging are avoided.

The invention relates to a process for making relatively heavy agglomerates of solids from a suspension thereof in a liquid by imparting a turbulent motion to that suspension in the presence of a dispersion of an auxiliary liquid which promotes the agglomeration, the suspension and the auxiliary liquid being supplied continuously, in which process the suspension is supplied via a cylindrical chamber rotating around its axis, the curved surface of which is perforated constituting outlets, and one of the terminal faces of which is provided with an inlet for the suspension, and in which process the auxiliary liquid is supplied via one or more supply channels terminating near the curved surface of the cylindrical chamber.

As a result of the rotating motion of the cylindrical chamber, the suspension is flung out of the perforations and deposits so not form near the outlets. In the immediate vicinity of that chamber, intense stirring takes place owing to the rotation of the chamber and to the suspension being flung out. This stirring is favorable for preventing the formation of large sticky masses. Generally, the auxiliary liquid will come into contact with the suspension only at some distance from the outlets for the suspension, so that the risk of those outlets becoming clogged is very small. Agglomerates being formed are moving in a direction away from the cylindrical chamber; and in addition, if a quantity of agglomerate already formed should, nevertheless, come into contact with the cylindrical chamber, then adhesion thereof to the wall of the chamber will be prevented by the centrifugal force to which the contacting mass is immediately subjected. By providing the supply of auxiliary liquid near the cylindrical chamber, for instance from evenly distributed outlets opposite the curved surface, it is ensured that the onset of the agglomeration takes place uniformly in all parts of the device. Thus the formation of a product of constant composition is achieved.

One of the terminal faces of the cylindrical chamber is closed while the other is provided with an inlet for the suspension. Preferably the suspension is supplied to the cylindrical chamber through a tube that forms the shaft on which the cylindrical chamber rotates.

As an alternative, the suspension may be supplied to the cylindrical chamber through a stationary tube in a coaxial position relative to the centerline of the cylindrical chamber. In this way the tendency for separation of particles from the suspension in the tube due to centrifugal action is prevented. When using a stationary supply tube, it may be desirable for the suspension to be displaced through the stationary tube by a rotating screw. In this way clogging of the pipe by settling of the suspension is avoided.

Preferably the speed of rotation of the cylindrical chamber is selected so that particles on the perforated cylindrical wall are subjected to an acceleration of at least 10 g., as it has been found that such acceleration insures that sticking of particles to the cylindrical wall will be prevented. Accelerations of this magnitude can easily be achieved. For instance, with a cylindrical chamber which has a radius of 2.5 cm. and which rotates with a speed of 1,000 revolutions per minute an acceleration of 25 g. is obtained.

This invention also includes an apparatus for carrying out the process described above. The apparatus includes a vessel provided with a supply device for the suspension and of a supply device for the auxiliary liquid promoting the agglomeration, and with a discharge device for agglomerates formed and for liquid. The vessel is also provided with means for imparting a turbulent motion to the suspension such as an impeller stirrer. The supply device for the suspension consists of a chamber inside the vessel, which chamber is bounded by a cylindrical surface and two terminal faces. The cylindrical surface is provided with perforations or openings, and one of the terminal faces is in communication with a tube for the supply of suspension to the chamber, while means are present for causing the chamber to rotate about its axis. The apparatus also includes one or more inlets, near the curved surface of the rotating chamber for introducing auxiliary liquid. The openings in the cylindrical surface may be circular holes or slits with their direction of the largest dimension substantially parallel to the axis of the chamber. Other shapes for the openings may also be used. Naturally, the dimensions of the holes or the slits should be chosen to pass the desired amount of the suspension, which will depend on the viscosity, particle size, and other characteristics of the particles and the auxiliary liquid.

The cylindrical wall of the chamber may be provided with projections directed outwardly to increase the turbulent motion of the suspension in the neighborhood of the rotating cylindrical chamber.

The cylindrical chamber may be coupled to the means for imparting a turbulent motion to the suspension. These means will mostly consist of rotating parts, such as a stirrer or a long cylinder, if necessary, provided with vanes. Either direct coupling may be employed or a transmission may be incorporated so that the stirrer and the chamber each rotate at the proper rate.

Figure 2:
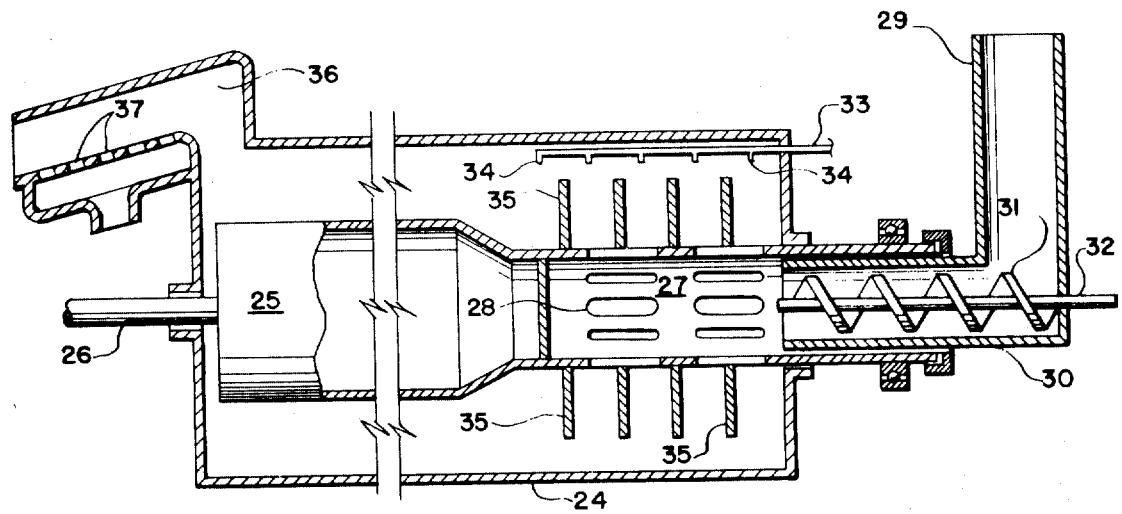

The invention will now be elucidated, by way of example, with reference to the accompanying drawings wherein:

FIG. 1 represents a longitudinal section through an apparatus according to the invention and FIG. 2 represents a longitudinal section through another apparatus according to the invention.

FIG. 1 shows a vessel 11 in which the agglomeration process is carried out. Auxiliary liquid is supplied through channels 12. Within the vessel 11 a cylindrical chamber 13 is provided. This chamber is connected with a tube 14 which extends outside the vessel 11. The tube 14 is provided with a bearing 15. The chamber 13 and the tube 14 can be made to rotate via a transmission 16 by a motor 17 which also imparts a rotating motion to vane stirrers 18. The suspension of solid substance in a liquid is introduced at inlet end 19 of the tube 14, which suspension leaves the chamber 13 through holes 20 in the cylindrical surface of the chamber 13. The outlet ends of the channels 12 are located in the neighborhood of the chamber 13. Owing to the turbulent motion of the contents of vessel 11 agglomerates are formed, for instance in the form of pellets. Through a discharge device 21 a flow of liquid and of pellets is passed. The liquid will flow off through outlet 22, while the pellets will leave the discharge device through outlet 23.

The embodiment according to FIG. 2 shows a vessel 24 in which the agglomeration process takes place. In this example the vessel has the shape of an elongated cylinder. In the vessel 24 a cylindrical rotor 25 is provided, which can be driven by a shaft 26. The rotor 25 is rigidly coupled to a cylindrical chamber 27, as a result of which this chamber will start to rotate simultaneously with a rotating motion being imparted to the rotor. THe cylindrical wall of chamber 27 is provided with slit-shaped openings 28. The suspension is supplied through a stationary tube 30 from inlet end 29 thereof to the chamber 27. An Archimedes' screw 31, driven individually by shaft 32 prevents settling of the suspension in the tube 30. The suspension leaves the chamber through the slits 28. The auxiliary liquid is supplied into the vessel 24 through a pipeline 33 having a plurality of outlets 34. Projections 35 in the form of bars are fitted on the rotating chamber 27 in order to reinforce the turbulent motion of the liquids. A discharge pipe 36 provided with a sieve bottom 37 enables separation of the pellets from the liquid.

As an example of this invention, a water slurry containing 10 percent coal fines is introduced into the apparatus and passes through the perforations in the cylinder. In the vicinity of the rotating curved surface, a light liquid pitch is introduced in a quantity amounting to about 3 percent by weight of coal fines. Due to the turbulence in the mixing zone and during progress towards the discharge tube, substantially all of the coal fines enter the dispersed pitch phase, and agglomerates between about 1 and 5 mm. in diameter are formed. When these agglomerates are recovered and the water removed from them, they are found to be irregular spheres in shape, dry to the touch, not dusty, and with good enough mechanical strength to be transported. The agglomerates are useful for fuel or as a source of carbon for chemical conversion processes, e.g., manufacture of hydrogen by reduction of steam.

What is claimed is:
1. A process for making agglomerates of solids suspended in a liquid comprising
   A. introducing the suspension within a rotating cylindrical chamber having a perforated curved wall and being contained in a vessel, said vessel being provided with
      i. a stirrer
      ii. means for introducing auxiliary liquid near the curved surface of the cylindrical chamber, the auxiliary being such as to promote agglomeration of solids
      iii. means for removing solids and liquids
   B. introducing auxiliary liquid through the means provided therefor as a dispersed phase and in quantities sufficient to form agglomerates
   C. stirring the liquid within said vessel while suspension and auxiliary liquid are being introduced
   D. recovering formed agglomerates from the liquid removed from the vessel.
2. The process of claim 1 wherein said rotating cylindrical chamber rotates at sufficient speed to produce an acceleration of at least 10 g. at its curved surface.